Figure 1:
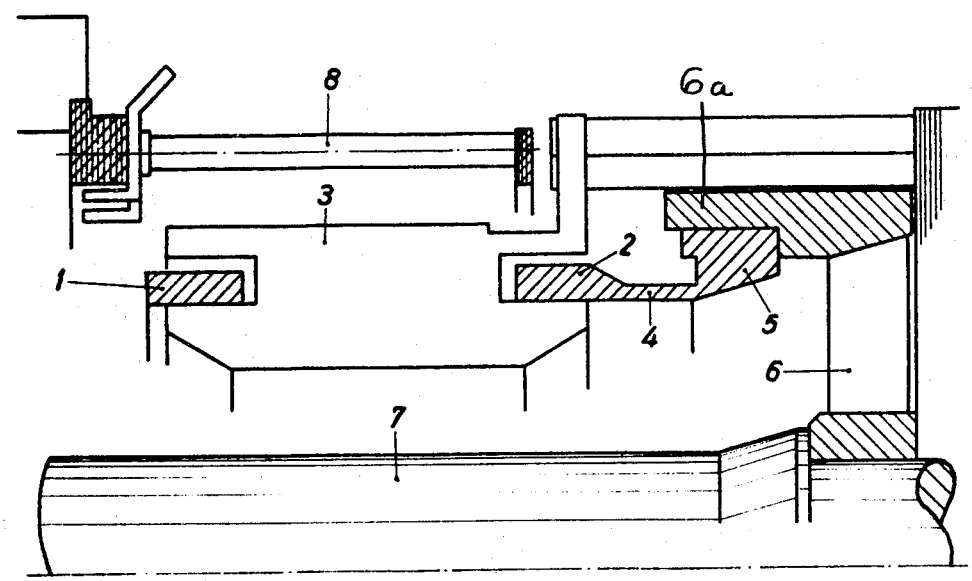

United States Patent [19]
Heil

[11] 3,742,273
[45] June 26, 1973

[54] STRUCTURE FOR SUPPORTING A COMMUTATOR ASSEMBLY ON THE ROTOR OF A DYNAMO-ELECTRIC MACHINE

[75] Inventor: Werner Heil, Birr, Switzerland

[73] Assignee: Aktiengesellschaft Brown, Boveri & Cie, Baden, Switzerland

[22] Filed: Nov. 29, 1971

[21] Appl. No.: 202,995

[30] Foreign Application Priority Data
Dec. 3, 1970 Switzerland.................. 17931/70

[52] U.S. Cl.................................. 310/236, 310/42
[51] Int. Cl. ....................................... H02k 13/04
[58] Field of Search................... 310/233, 235, 236, 310/42

[56] References Cited
UNITED STATES PATENTS

| | | | |
|---|---|---|---|
| 2,899,574 | 8/1959 | Jungk................................. | 310/234 |
| 3,662,200 | 5/1972 | Rank.................................... | 310/42 |
| 935,300 | 9/1909 | Dick..................................... | 310/233 |
| 2,660,682 | 11/1953 | Clokey................................ | 310/234 |
| 2,080,615 | 3/1963 | Carlson............................... | 310/235 |
| 1,260,743 | 3/1918 | Attila................................... | 310/42 |

Primary Examiner—R. Skudy
Attorney—Ralph E. Parker and Eugene J. Roberts et al.

[57] ABSTRACT

Structure for supporting on the rotor shaft of a dynamo-electric machine a commutator composed of a cylindric assembly of commutator bars includes first and second shrink collars shrunk into place in annular recesses provided respectively at opposite ends of the commutator, and a third shrink collar integral with the second collar and inter-connected with the latter by means of a thin-walled tubular part which is elastic in the radial direction. The commutator is secured to the rotor shaft by means including the third shrink collar, and the thin-walled inter-connecting part which together with the second and third shrink collars is fabricated from a single piece of metallic material, due to its radially elastic characteristic serves to accommodate a change in diameter of the first and second shrink collars caused by heating and expansion of the commutator without affecting the diameter of the third shrink collar. The commutator is also free to expand axially in the direction of the first shrink collar by virtue of non-attachment to the rotor shaft.

4 Claims, 3 Drawing Figures

STRUCTURE FOR SUPPORTING A COMMUTATOR ASSEMBLY ON THE ROTOR OF A DYNAMO-ELECTRIC MACHINE

The present invention is concerned with rotary electric machines of the dynamo-electric type and is directed in particular to an improved arrangement for supporting the commutator assembly on the rotor by way of shrunk-on collars.

It is already known to contract the commutator bars of commutator assembly onto a bushing which is then fastened in place on the rotor. Another solution, known and used especially in conjunction with commutator assemblies employing a pair of shrunk-on collars, is to fasten one or both collars at supporting rings, with the latter contracted, in turn, onto the rotor, or onto a rotor-supporting structure.

However, all of these previously known mounting modes for the commutator assembly have the disadvantage that the state of the stress produced in a commutator assembly, consisting of a shrunken assembly of commutator bars will be affected detrimentally upon installation and/or during operation.

If, in the case where internal centering is used, the commutator bar assembly is contracted in full, or in part onto the rotor shaft, or if the commutator shrunk-on collar is contracted onto a supporting ring, this mode will result in a decrease in the arch-pressure within the commutator bar assembly, thus detrimentally affecting its stability.

If in the case where external centering is used, wherein the commutator bar assembly is fastened by way of its shrunk-on collars to supporting rings, its capability to move in a radial direction will be impeded by the rings which are inflexible in a radial direction. Thus, when the commutator structure heats up during operation of the machine, the arch-pressure of the commutator bar assembly will increase because expansion of the outer shrunk-on collars, caused by the heat, is restricted by the supporting rings connected to the collars. On the other hand, those forces which act upon the supporting rings in a radially outward direction will cause a loosening of the seats of the carrying rings at the shaft, thus leading to the generation of vibrations, and thus impairing safe operation of the machine.

It is also known to fix the position of the shrunk-on collar, located at one end of the commutator, by means of a centering ring arranged at the rotor shaft. Such a centering ring must not be elastic in a radial direction since, otherwise, the shrunk-on collar cannot be held properly in place under different working conditions. Therefore, by necessity, this arrangement also results in the same disadvantageous aspects as occur in the case of the above-discussed mode of external centering in conjunction with supporting rings.

As a matter of principle, it can be stated that any detachable connection between two shrunk-on collars, to be coupled positively with each other, will affect in an undesirable manner that state of stress.

The general object of the present invention is to provide an improved mode of securing a commutator assembly to the rotor shaft of a dynamo-electric machine, and which is not impaired by any of the disadvantages which characterize the previously designed modes.

This objective is achieved in that the commutator bar assembly is fixedly arranged, directly, or indirectly, at the rotor shaft by means of a support which includes two shrunk-on collars that are interconnected with each other by an intermediate tubular part, this composite support, i.e., the two collars and their intermediate tubular connecting part being integrated into a unitary structure. The tubular connecting part intermediate the two collars is elastic in a radial direction, and is so designed that its elasticity in such direction will permit a change in the radial dimensions of one of the shrunk-on collars, within a range determined by its installation and operation, without any effect on the radial dimension of the other shrunk-on collar.

In order to keep space requirements in an axial direction of the rotor to a minimum, it has also been found advantageous to arrange the two interconnected shrunk-on collars concentric with respect to each other and to give the part interconnecting the two collars a meandering configuration, as viewed in longitudinal cross-section.

If the length of the commutator assembly is relatively great, it becomes necessary to also take into consideration its expansion, due to heat, in the axial direction. However, since the commutator assembly according to the present invention is fixedly secured to the rotor shaft solely by one unitary structure which is located only at one end of the commutator assembly, the other end of the commutator is free to expand in the axial direction.

Figure 2:
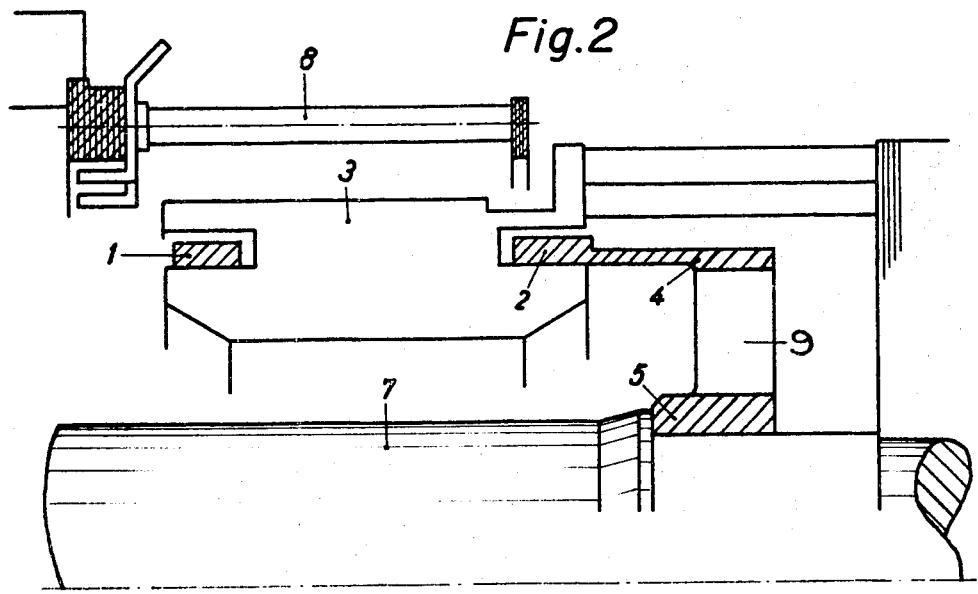
Figure 3:
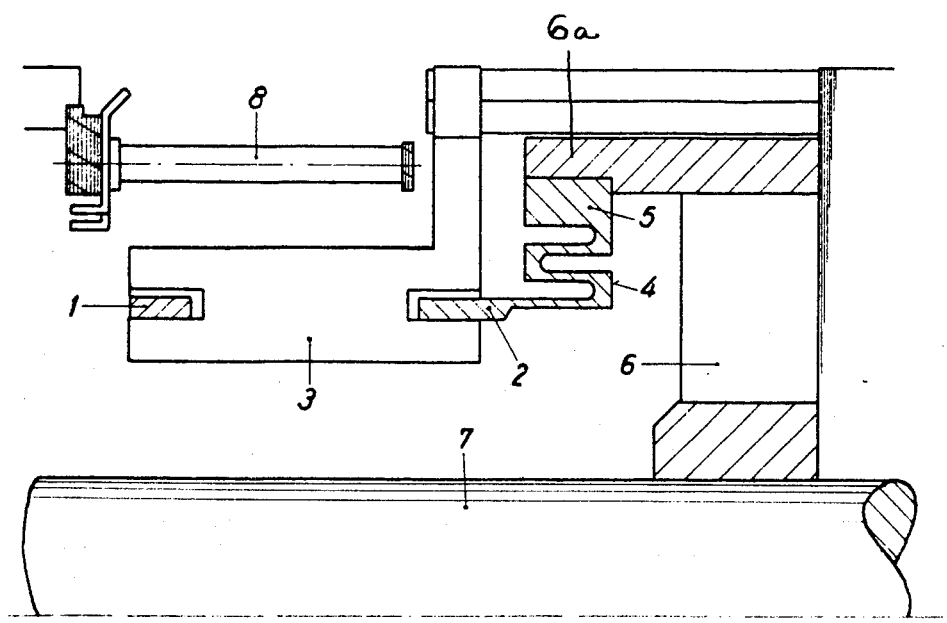

The foregoing as well as other objects and advantages inherent in the invention will become more apparent from the following detailed description of three different embodiments thereof and from the appertaining accompanying drawings wherein:

FIG. 1 is a half-longitudinal sectional view of the commutator end of the rotor taken through the axis of the latter and wherein one of the two collars supporting the commutator bar assembly is secured in an indirect manner to the rotor shaft;

FIG. 2 is a view similar to FIG. 1 but showing a slightly modified embodiment wherein one of the two collars supporting the commutator bar assembly is secured directly to the rotor shaft; and FIG. 3 is a view similar to FIG. 1 but showing a further modification wherein the structural part which interconnects the two collars supporting the commutator bar assembly is given a meandering configuration as viewed in this figure in order to conserve space in the axial direction.

With reference now to FIG. 1, which shows only the commutator end of the rotor shaft of the machine, the commutator structure 3 is comprised of the usual cylindric assembly of commutator bars which are held together by means of first and second collars 1 and 2 inserted into annular recesses provided respectively in the operate end faces of the commutator assembly. These collars are shrunk-on following installation in their respective recesses. Support for commutator assembly about the rotor shaft 7 is provided by collar 2, it being seen that this the second collar is structurally integrated with a third shrunk-on collar 5 through a tubular inter-connecting part 4 which is purposely made elastic in the radial direction. Collar 5 is secured to the rotor shaft 7 in an indirect manner by way of an intermediate radially extending support structure 6. The rod 8 extending axially and radially outside of the commutator structure 3 serves as a support for the brushes, not shown, which ride in contact with the commutator bars.

As will be seen from FIG. 1, the the first shrunk-on collar 1 is not fastened in any manner and hence this end of the commutator structure remains free to allow for axial expansion thereof when heated.

The wall at the tubular, inter-connecting part 4 between the second and third collars 2 and 5 is chosen relatively thin so that its elasticity in the radial direction will permit changes in radial dimensions of the shrunk-on collar 2 within the range determined by its installation and the various operating conditions to be encountered, but will have no effect on the contracted seat of the other, third shrunk-on collar 5, which as previously stated forms an integral part of the composite structure (2-4-5). Due to the specific design of the intermediate part 4 it likewise is not possible that the contraction forces, exerted by the shrunk-on collar 2 conjointly with the commutator structure 3 could be altered during contraction of the third shrunk-on collar 5 at the support 6 because the two shrinking connections are neutralized by the intermediate part 4 by virtue of the radial elasticity characteristic of the latter. Since a detachable connection between the two shrunk-on collars 2 and 5 does not exist, an undesirable change in this connection, such as a loosening thereof, cannot occur during any operation of the rotor.

The above-described support for the commutator structure also has an additional important advantage in that the existing stress conditions are quite distinct so that the commutator and its fastening can be calculated with precision. Furthermore, since due to the improved support structure, the fastening does not impose any additional mechanical stresses on the commutator, a lighter and less expensive construction becomes feasible. This applies also to the modified construction shown in FIG. 2 which will now be described. Also, a commutator structure supported only at one end thereof in accordance with the invention, offers an additional advantage that cooling air can flow freely through and below it.

In the modified construction depicted in FIG. 2, which like FIG. 1 shows the commutator end of the machine in longitudinal section, the inter-connecting part 4 between the second and third collars is so designed that the third shrunk-on collar 5, contacts the rotor shaft 7 directly (instead of indirectly as in the FIG. 1 embodiment). The radially extending section of the inter-connecting part 4 is provided with several bores 9 which extend parallel to the rotor axis for the passage of cooling air flowing in the axial direction.

If it is desired to save space in the axial direction, the shrunk-on collars 2 and 5 structurally integrated through the inter-connected tubular section 4 can be arranged concentrically relatively to one another, and the inter-connecting part 4 is given a meandering configuration, as viewed in longitudinal section, in the manner depicted in FIG. 3 which otherwise is similar to the FIG. 1 embodiment. Here again, as in the case of the other two embodiments, the commutator structure is supported only at one end so that cooling air can flow freely below it.

Also, as in FIG. 1, the rigid, shrink connection between collar 5 and the rotor shaft is easily established by shrinking inner periphery of the outer cylindrical part 6a of support 6 onto the outer periphery of collar 5. Another, but more complicated way in which to establish the desired shrink connection would be to under-cool the collar during assembly procedure.

I claim:

1. Structure for supporting on the rotor shaft of a dynamo-electric machine a commutator composed of a cylindric assembly of commutator bars which comprises a first shrink collar inserted into an annular recess provided at one end of said commutator and shrunk into place, a second shrink collar inserted into an annular recess provided at the opposite end of said commutator and shrunk into place, a third shrink collar integral with said second collar and inter-connected therewith by means of a thin-walled tubular part and which is elastic in the radial direction, and means including said third shrink collar for securing said commutator to said rotor shaft, said second and third shrink collars and said thin-walled inter-connecting part therebetween being constituted by a single piece of metallic material, and said radially elastic characteristic of said thin-walled inter-connecting part serving to accommodate a change in diameter of said first and second shrink collars caused by heating and expansion of said commutator without affecting the diameter of said third shrink collar, said commutator also being free to expand axially in the direction of said first shrink collar by virtue of non-attachment to said rotor shaft.

2. Structure as defined in claim 1 for supporting a commutator on the rotor shaft of a dynamo-electric machine wherein said third shrink collar is secured indirectly to said rotor shaft.

3. Structure as defined in claim 1 for supporting a commutator on the rotor shaft of a dynamo-electric machine wherein said third shrink collar is secured directly to said rotor shaft.

4. Structure as defined in claim 1 for supporting a commutator on the rotor shaft of a dynamo-electric machine wherein said second and third shrink collars are located concentrically but at different radial distances from the rotor shaft and wherein said tubular inter-connecting part therebetween has a meandering configuration as viewed in longitudinal section.

* * * * *